Aug. 9, 1955          O. C. OLSEN          2,714,967
APPARATUS FOR TRANSPORTATION OF FREIGHT
Original Filed Feb. 14, 1939          6 Sheets-Sheet 2
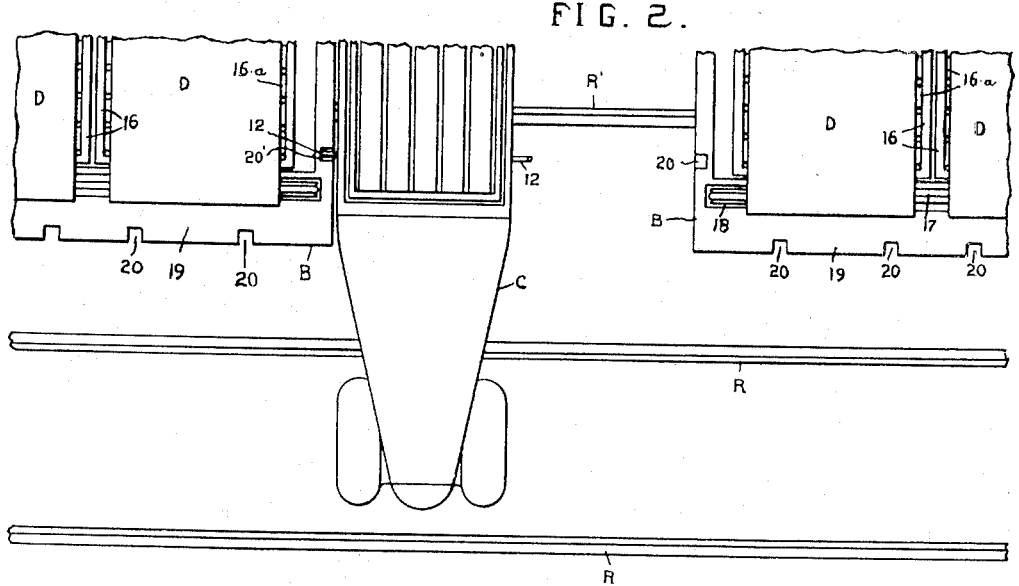
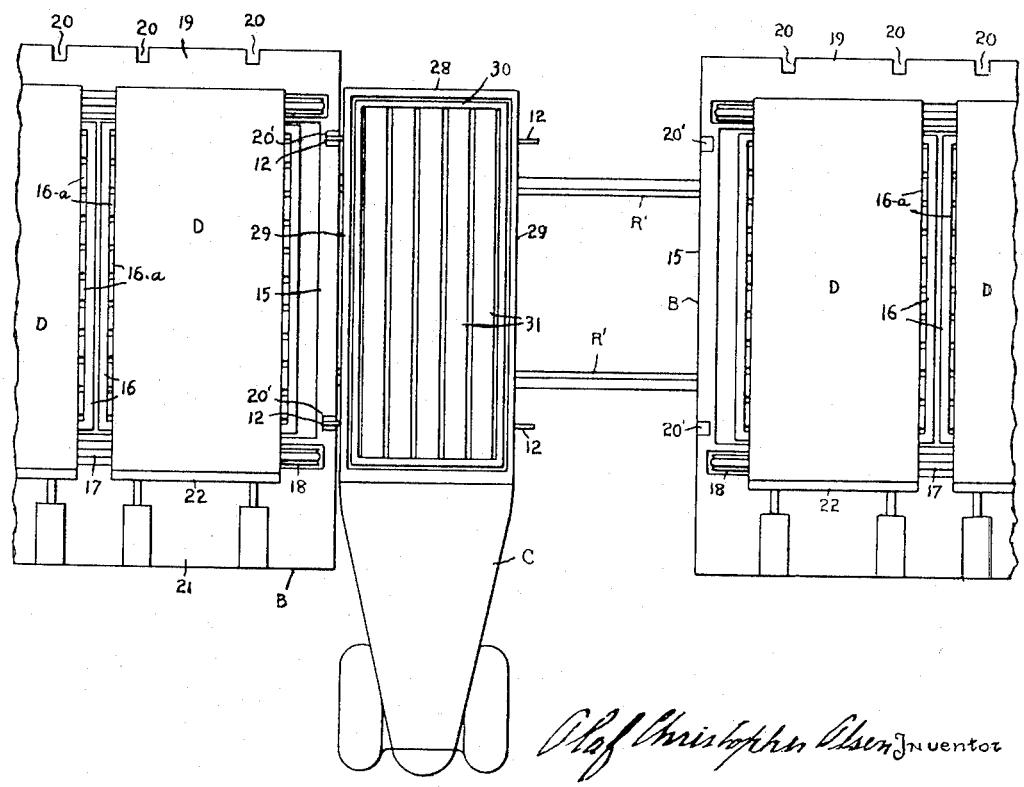

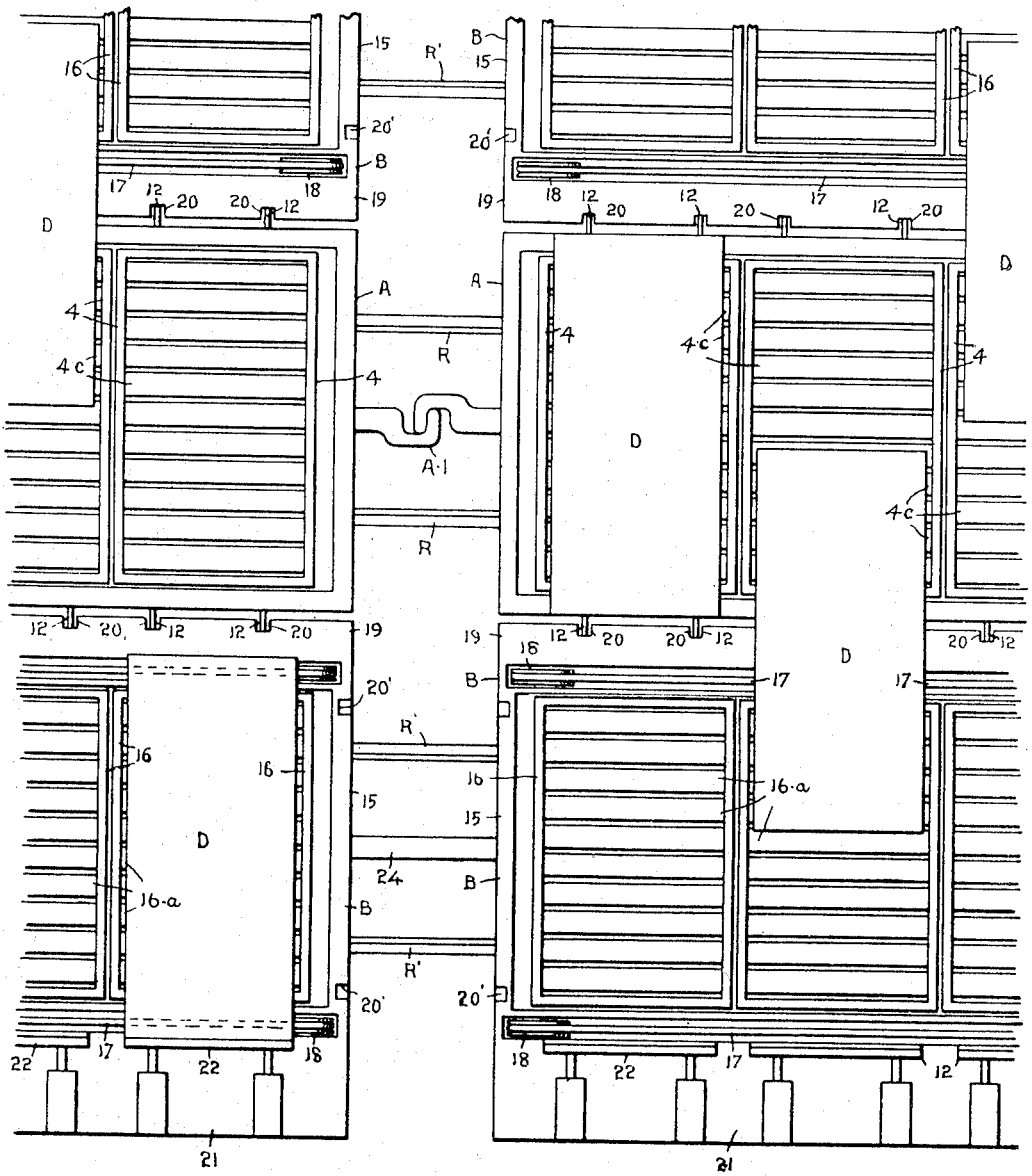

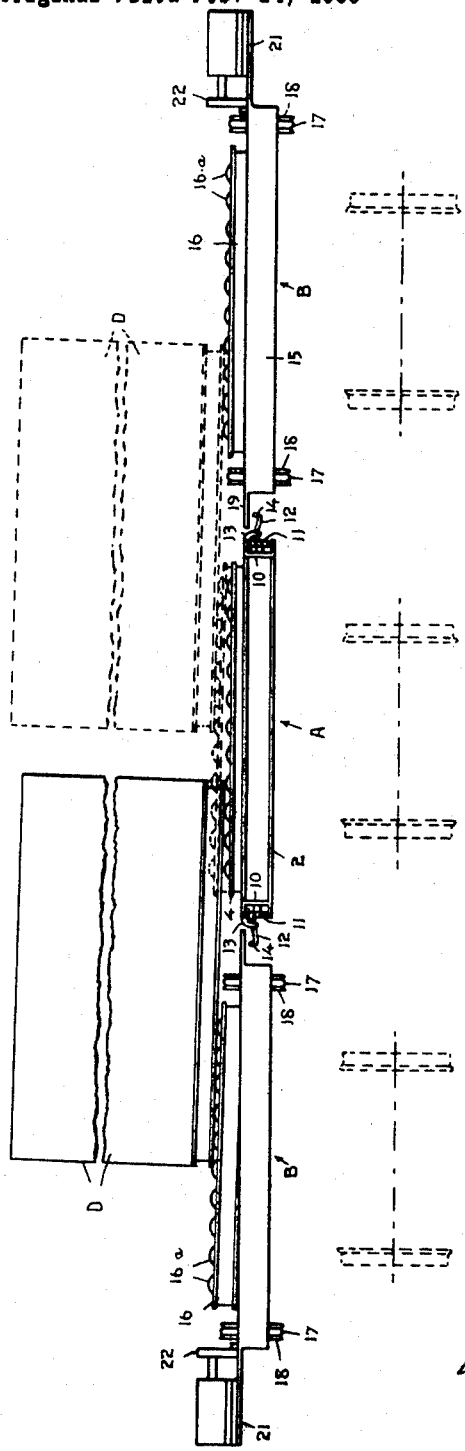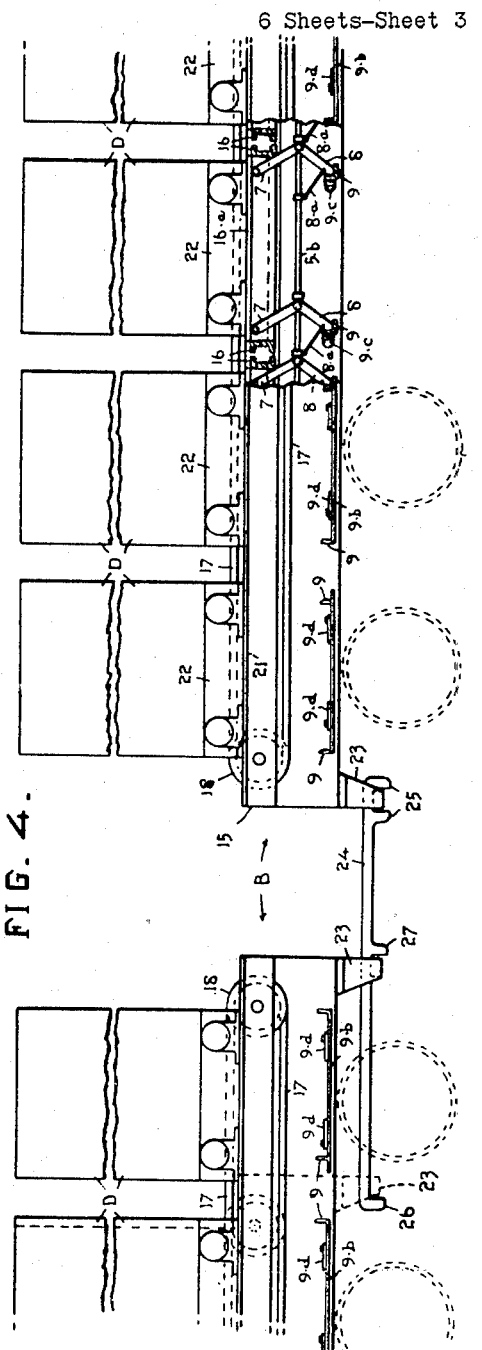

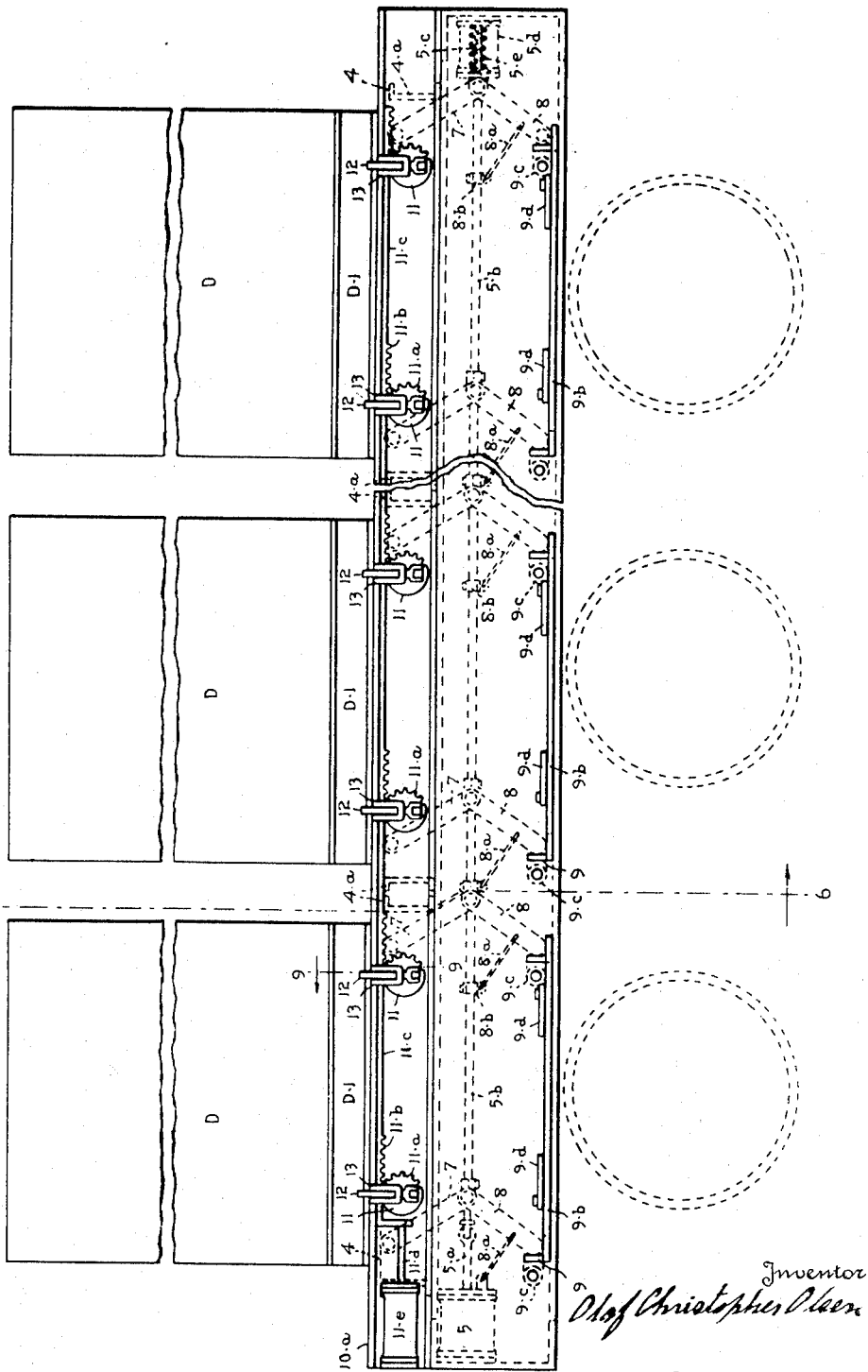

Aug. 9, 1955     O. C. OLSEN     2,714,967
APPARATUS FOR TRANSPORTATION OF FREIGHT
Original Filed Feb. 14, 1939     6 Sheets-Sheet 5

Inventor
Olaf Christopher Olsen
By Ogle R. Singleton
Attorney

Aug. 9, 1955 O. C. OLSEN 2,714,967
APPARATUS FOR TRANSPORTATION OF FREIGHT
Original Filed Feb. 14, 1939 6 Sheets-Sheet 6

Olaf Christopher Olsen, Inventor

By Ogle R. Singleton

Attorney

United States Patent Office 2,714,967
Patented Aug. 9, 1955

2,714,967

APPARATUS FOR TRANSPORTATION OF FREIGHT

Olaf Christopher Olsen, Johnson County, Kans., assignor to Transport Equipment, Inc., a corporation of Maryland Substituted for application Serial No. 256,341, February 14, 1939. This application May 10, 1950, Serial No. 161,209

9 Claims. (Cl. 214—38)

My invention consists in a new and useful improvement in apparatus for the transportation of freight, and is designed more particularly for transportation of freight of less than carload lots in containers which are handled entirely mechanically by conveyor mechanisms incorporated in vehicles and loading and unloading platforms. This application is a substitute application for Application Serial Number 256,341, filed February 14, 1939 and now abandoned. The particularly novel and useful feature of my apparatus is the combination of containers for the freight, railroad cars, highway trucks and platforms, which are so designed that a single container can be imposed on each truck for transportation, and a plurality of containers can be imposed on a car for transportation, each container being disposed longitudinally of a truck, but transversely of a car, the cars, trucks and platforms being so related that the containers are moved sideways onto and off of the trucks and platforms and endwise onto and off of the cars and platforms. It is obvious that by co-relating the instrumentalities of my improved apparatus, the maximum loading capacities of both trucks and railroad cars are utilized.

While I have illustrated in the drawings filed herewith and have hereinafter fully described certain specific embodiments of my invention, it is to be distinctly understood that I do not consider my invention to be limited to said specific embodiments, but refer for its scope to the claims appended hereto.

In the drawings:

Fig. 1 is a top plan view of the railroad cars and platforms, related for moving the containers to and from the cars.

Fig. 2 is a top plan view of the highway trucks and platforms, related for moving the containers to and from the trucks.

Fig. 3 is an end elevation of the cars and platforms related as illustrated in Fig. 1.

Fig. 4 is a side elevation of two of the platforms related as illustrated in Fig. 1.

Fig. 5 is a side elevation of one of the cars showing the containers mounted and locked thereon.

Figure 6:
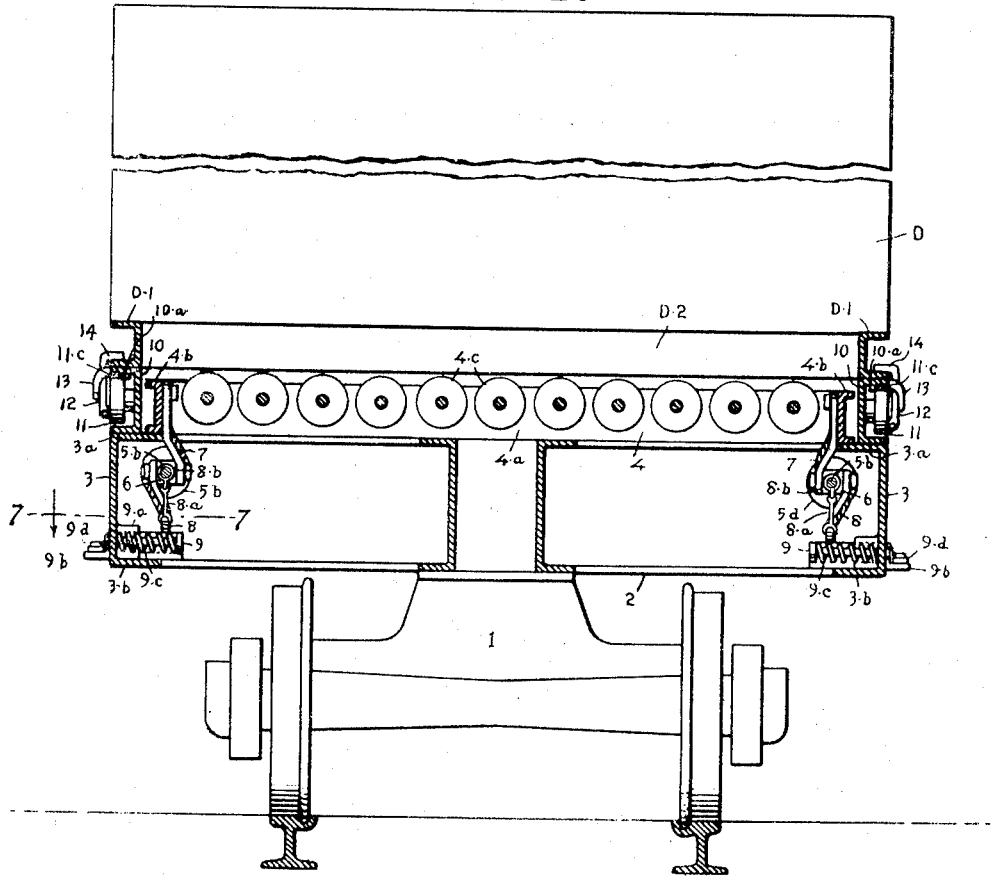
Fig. 6 is a transverse vertical section on line 6—6 of Fig. 5.

As illustrated in the drawings, my improved apparatus comprises railroad cars A, traveling on rails R, platforms B, traveling on rails R', highway trucks C, and containers D to be charged with freight and transported by cars A and trucks C.

I will now describe the details of construction of one of the cars A (Figs. 1, 3, 5, 6, 7, 8, 9, 10). Suitably mounted on the trucks 1 is the body 2 provided on each side with a U-beam 3. Carried on the top flanges 3–a of these beams 3 is a series of frames 4, each formed by a pair of U-beams 4–a disposed transversely of the car A and a pair of U-beams 4–b disposed longitudinally of the car A on the flanges 3–a. Suitably journaled in the beams 4–a is a series of rollers 4–c, their upper surfaces extending slightly above the upper edges of the beams 4–a. Suitably mounted at one end of the car A, on each of the side beams 3 there is a pressure chamber 5 with piston 5–a and any suitable means for applying pressure to said piston 5–a. To this piston 5–a there is attached a cable 5–b extending the length of the car A and attached to piston 5–c in chamber 5–d and provided with retractive spring 5–e, the chamber 5–d being provided with a suitable bleed.

Mounted on each cable 5–b is a series of blocks 6 to which are pivoted toggle bars 7 and 8. The bars 7, extending upwardly from the blocks 6, are pivotally mounted on the beams 4–b of the frames 4. It is to be understood that (Figs. 5 and 6) these toggle bars 7 and 8 are so disposed on the cables 5–b that a bar 7 is positioned at each corner of each of the frames 4. The bars 8, extending downwardly from the blocks 6, are controlled by abutments 9 slidable on the lower flanges 3–b of the beams 3 and through the beams 3 and collars 9–a mounted thereon, and provided with operating handles 9–b, retractive springs 9–c and stop pins 9–d hingedly mounted on handles 9–b to bear against beams 3. It is to be understood that each handle 9–b is attached to the pair of abutments 9 for controlling the pair of bars 8 associated with the pair of bars 7 pivoted on one side of each frame 4. Each bar 8 has the expansible check cord 8–a mounted by a collar 8–b on the cable 5–b. Suitably mounted on the top flanges 3–a of the beams 3 are the U-beams 10 slightly wider than the beams 4–a and 4–b of the frames 4. The top flanges 10–a of the beams 10 support the end U-beams D–1 of the containers D, when the frames 4 are retracted to impose the containers D on the beams 10. When the frames 4 are raised, the rollers 4–c bear against the side beams D–2 of the containers D to raise the containers D from the beams 10. Suitably journaled on each of these beams 10, there is a series of rotatable blocks 11, each provided with a peripheral segmental rack 11–a meshing with a rectilinear rack 11–b on a reciprocable rod 11–c slidably mounted on the lower face of the flange 10a of each beam 10. Each rod 11–c is provided with an operating piston 11–d in a pressure chamber 11–e mounted on the beam 10. Each of the blocks 11 has an eccentric shaft 11–f to the head of which is pivoted the forked ends of a link 12 passed through a yoke 13 mounted on the flange 10–a, and having its upper end formed as a locking hook 14. As is obvious from Fig. 9, the links 12 are so disposed that when depressed they cause the hooks 14 to lock the beams D–1 of the container D upon the flanges 10–a of the beams 10 of the car A, and when raised permit the hooks 14 to move by gravity into the yokes 13 clearing the beams D–1. It is to be understood that the hooks 14 are so disposed relative to the beams 10 that a pair of hooks 14 is provided for the end beams D–1 of the container D disposed over each frame 4 of the car A. The cars A are provided with the usual couplers A–1.

I will now describe the details of construction of one of the platforms B (Figs. 1, 2, 3, 4). The body or chassis 15 of the platform is suitably mounted on trucks adapted to be moved by any suitable means to travel on the rails R' suitably disposed relative to the rails R for the cars A. The body 15 of the platform B is the same length as the body 2 of one of the cars A. The body 15 has mounted thereon a series of transversely disposed frames 16 of substantially the same form as the frames 4 of the car A, and is provided with the same mechanism for individually moving the frames 16 for vertical adjustment, as is provided on the car A for the frames 4. It is to be understood that when the car A and platform B are placed side by side, the frames 4 of the car A register with the frames 16 on the platform B. The body 15 is provided with the longitudinally disposed conveyor cables 17 rove over pulleys 18 provided with any suitable power means for operating the cables 17. It is to be noted (Fig. 4) that the upper run of the cables 17 is above the upper edge of the body 15, and it is to be understood that (Fig. 3) the degree of vertical movement provided for the frames 16 is such that the upper faces of the rollers 16-a of the frames 16 can be moved above and below the horizontal plane of the upper run of the cables 17. The body 15 on its side adjacent the car 4 has a cat-walk 19 having slots 20 through which the links 12 and hooks 14 of the car A may pass. The body 15 has on its opposite side an outwardly extending platform 21 on which are mounted a series of spring bumpers 22, each registering with one of the frames 16. Each platform B is provided at each end with a depending yoke 23 and for each pair of platforms B there is provided a spacer bar 24 having the lugs 25 at one end, a lug 26 at the other end, and an intermediate lug 27. The bar 24 is passed through the yokes 23, the lugs 25, 26 and 27 depending. The lugs 25 disposed on either side of one yoke 23 fix the bar 24 in relation to one of the platforms B, and the intermediate lug 27 bearing against the outer face of the yoke 23 of the adjacent platform B, the bar 24 serves to space the pair of platforms B at the proper distance, exactly corresponding with the space between the adjacent cars A for the couplings A', whereby the platforms B and the cars A can be properly registered, as illustrated in Fig. 1. When the platforms B are moved apart, the lugs 26 on the bars 24 bear against the inner faces of the yokes 23, and the bars 24 serve to space the pairs of platforms B at the proper distance to provide two-way driveways between each pair of platforms B, and when the platforms B have been thus positioned, and the spacer bars 24 removed, the highway trucks C can proceed either way on such driveways and be positioned relative to the platforms B, as illustrated in Fig. 2.

Figure 12:
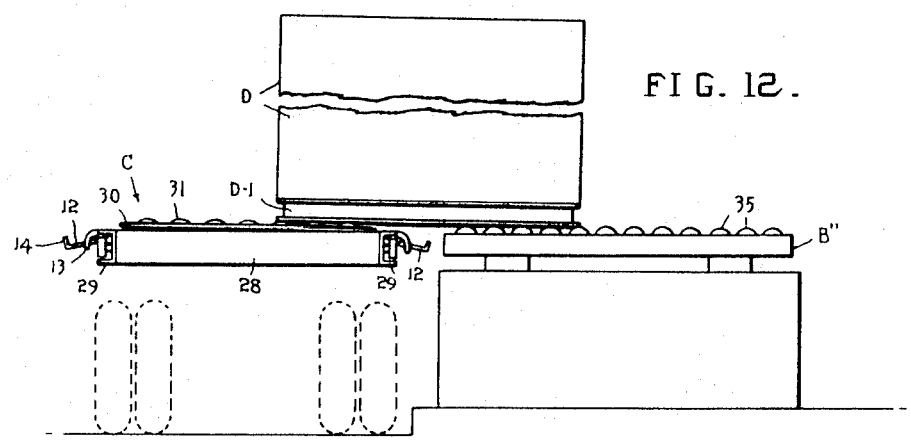
Fig. 12 is an end elevation of a truck and an elevator platform.

I will now describe the details of construction of the truck C (Figs. 2, 12). The body or chassis 28 of the truck C has the side U-beams 29, similar to the beams 10 of the car A, on which rest the side beams D-2 of the container D when the container D is imposed upon the truck C. Mounted on the body 28 is a single frame 30 of substantially the same form as the frames 4 of the car A and the frames 16 of the platform B, and provided with the same mechanism for moving the frame 30 for vertical adjustment, as is provided for the frames 4 and 16. The rollers 31 of the frame 30 bear against the end U-beams D-1 of the container D when the frame 30 is raised to lift the container D from the beams 29. Each beam 29 is provided with a pair of links 12 and their hooks 14 with operating mechanism, as on cars A, to lock the side beams D-2 on the beams 29, and slots 20' are provided in the ends of the platforms B to accommodate the links 12 when in open position adjacent the platforms B.

Figure 10:
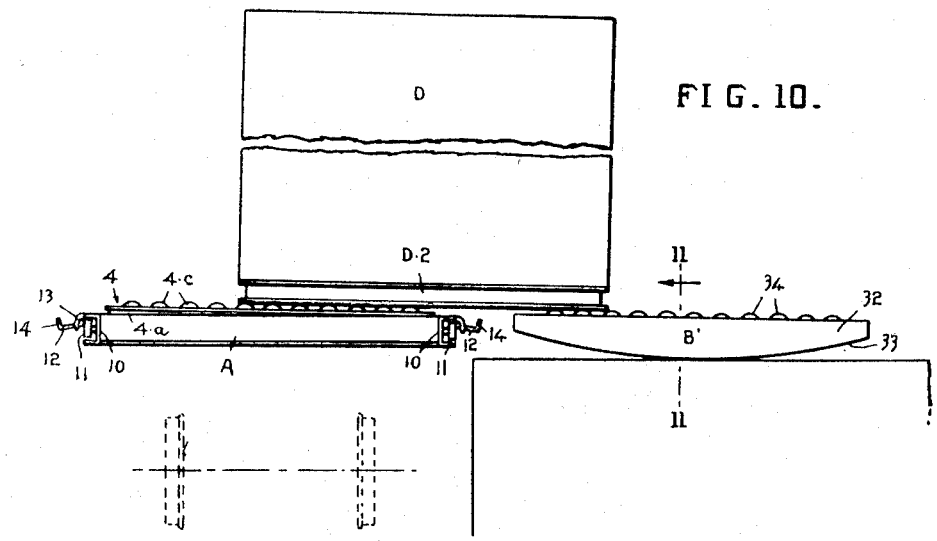
Fig. 10 is an end elevation of a car and a portable platform.
Figure 11:
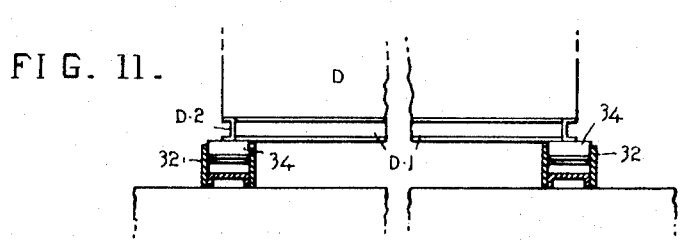
Fig. 11 is a transverse vertical section on line 11—11 of Fig. 10.

In Figs. 10 and 11, I have illustrated a modified form of platform B' comprising two frames 32 having arcuate lower faces 33 and rollers 34 to bear against the beams D-1 or D-2 of the container D. In Fig. 12 I have illustrated an elevator platform B'' having rollers 35 to bear against the beams D-1 or D-2 of the container D.

From the foregoing description of the details of construction of my improved apparatus, its operation and use will be obvious. When the cars A and the platforms B have been related as illustrated in Fig. 1, the containers D can be caused to travel between the cars A and platforms B, by the adjustment of frames 4 of the cars A and the frames 16 of the platforms B.

I will now describe the operation of my apparatus whereby the containers D are moved from one of the cars A to one of the platforms B.

By manipulation of the control valves of the pressure chambers 11-e on car A, the pistons 11-d are caused to reciprocate the rods 11-c, thereby rotating the blocks 11, and causing the links 12 to rise, releasing the hooks 14 from the end beams D-1 of the containers D, the links 12 swinging on shafts 11-f to rest in yokes 13, and passing through slots 20 in catwalk 19 of the platform B (Figs. 1, 3). By manipulation of the control valves of the pressure chambers 5 on the car A, the pistons 5-a are caused to draw the cables 5-b toward the chambers 5, thereby expanding the toggle bars 7 and 8, and causing their associated frames 4 to rise from the top flanges 3-a of the beams 3 of car A, their rollers 4-c bearing against the side beams D-2 of the containers D and raising the containers D from the beams 10 of the car A. It is to be understood that the containers D are raised sufficiently to clear the upper run of cables 17 of the platform B. The frames 16 of platform B are raised by their associated mechanism (Fig. 4) in a manner similar to the adjustment of frames 4, so that the frames 4 and 16 are disposed in the same horizontal plane. By the proper manipulation of the control valve of the pressure chamber 5 which is located on the side of the car A opposite to the side adjacent the platform B to which the containers D are to be moved, the toggle bars 7 and 8 upon that side are further expanded, thereby raising one end of each frame 4 to tilt the frames 4 to the degree required to cause the containers D to roll upon rollers 4-c to pass onto the frames 16 (Fig. 3). The bumpers 22 associated with the frames 16 control the containers D to position them on the frames 16. The containers D can then be imposed upon the cables 17 of the platform B by lowering the frames 16. The platforms B are then adjusted, as illustrated in Fig. 2, and a truck C being laid alongside the end of platform B, the cables 17 deliver a container D to frame 30 of the truck C which has been adjusted vertically so that its rollers 31 are aligned horizontally with the upper run of the cables 17. The container D being received on frame 30, it is imposed on beams 29 of truck C by lowering of frame 30. The container D is then locked on truck C by links 12 and hooks 14, and can be transported by truck C.

Figure 7:
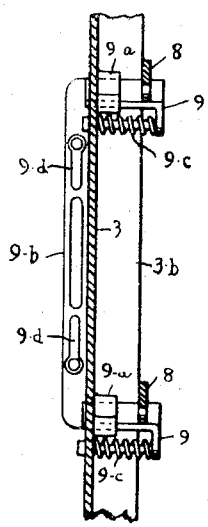
Fig. 7 is a longitudinal horizontal section on line 7—7 of Fig. 6.
Figure 8:
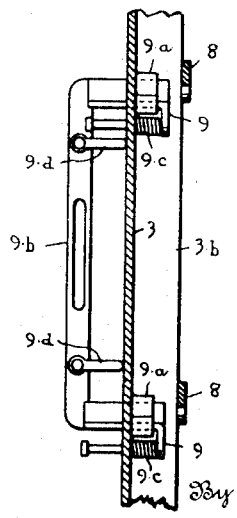
Fig. 8 is a view similar to Fig. 7, the parts being retracted.
Figure 9:
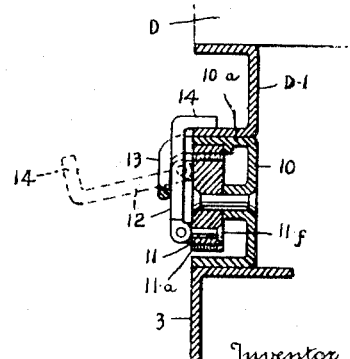
Fig. 9 is an enlarged vertical section of a detail of Fig. 6, showing one of the locking means for the container on the car.

It is obvious that by a reversal of the aforesaid steps a container D can be moved from a truck C to a car A. It is to be noted that by manipulation of the handles 9-b to retract abutments 9, the pairs of bars 8 associated with any one of the frames 4 or frames 16 can be rendered inoperative (Figs. 7, 8). Thus it is possible to render each of the frames 4 of the car A, or each of the frames 16 of the platform B inoperative or operative as desired. It is obvious, therefore, that by my improved apparatus I can cause all or any desired number of the containers D on a car A or a platform B to travel therefrom.

The modified form of platform B', illustrated in Figs. 10 and 11, can be utilized with cars A and trucks C when the platform B is not available. The platform B' can be carried with either car A or truck C, and be available whenever required. By rocking platform B' upon the arcuate faces 33, the plane of rollers 34 can be varied to cause the containers D to move thereon. The platform B'', illustrated in Fig. 12, may be utilized when it is desired to move the containers D, from cars A or trucks C, to various levels, by means of an ordinary freight elevator, as loading or unloading with sidewalk elevator.

Having described my invention, what I claim is:

1. In apparatus for transporting freight, the combination of a plurality of track-travelling vehicles; a plurality of platforms; a plurality of road-travelling vehicles; a plurality of freight containers; a plurality of supporting media for said containers, each of said media being vertically adjustable and tiltable, and adapted to support one of said containers, one of said media being carried by each of said road-travelling vehicles, a series of said media being carried by each of said track-travelling vehicles and each of said platforms, said series carried by each of said track-travelling vehicles, and said series carried by each of said platforms being adapted to co-act to cause the containers to move by gravity between said track-travelling vehicles and said platform; and a pair of conveyor cables adapted to move the containers longitudinally of each of said platforms, the supporting media on the platform being between and normally below the level of said cables, and said cables being adapted to co-act with said media carried by each of said road-travelling vehicles and the series of media carried by each platform to cause the containers to move between said road-travelling vehicles and said platforms.

2. In apparatus for transporting freight, the combination of a railroad car; a platform; a road truck; a plurality of freight containers; a series of frames on the car; a series of frames on the platform; a single frame on the truck; and a pair of conveyor cables disposed longitudinally of the platform, the frames on the platform being between and normally below the level of the cables, each of said frames being vertically adjustable and tiltable and adapted to support one of said containers, the series of frames on the car and the series of frames on the platform being adapted to co-act to cause the containers individually to move by gravity between the car and the platform, and the series of frames on the platform, the frame on the truck and the conveyor cables being adapted to co-act to cause a container to move between the platform and the truck.

3. In apparatus for transporting freight, the combination of a railroad car; a platform; a road truck; a plurality of freight containers; a series of supporting media disposed transversely of said car; a series of supporting media disposed transversely of said platform; a supporting medium disposed longitudinally of said truck; each of said media being vertically adjustable and tiltable and adapted to support one of said containers, each of the media on the car and each of the media on the platform being adapted to co-act to cause one of said containers to move endwise by gravity between said car and said platform; and a pair of conveyor cables on said platform adapted to cause each of said containers to move sidewise, the supporting media on the platform being between and normally below the level of said cables, the medium on said truck being adapted to cause a container to move sidewise by gravity from said truck onto said cables.

4. A system for transporting freight comprising a pair of parallel tracks; a train of railroad cars on one of said tracks; a plurality of mobile platforms on the other of said tracks, adapted to be alternatively related to form an unbroken train and a series of spaced platforms; a plurality of freight containers; a series of roadways disposed transversely of said pair of tracks; a plurality of road trucks; a series of frames on each of said cars; a series of frames on each of said platforms; a frame on each of said trucks, each of said frames being vertically adjustable and tiltable and adapted to support one of said containers, said frames being so disposed on the cars and the platforms that when the unbroken train of cars is positioned alongside of the unbroken train of platforms their respective series of frames register, the two series being adapted to cause the containers to move individually by gravity between the cars and the platforms; and a pair of conveyor cables disposed longitudinally of each of said platforms, the frames on the platforms being between and normally below the level of the cables, the frames on the trucks and the frames and cables on each of the platforms being adapted to cause the containers to move individually between the platforms and the trucks when the trucks are positioned between the spaced platforms.

5. In apparatus for handling freight, the combination of a plurality of railroad cars; a plurality of mobile platforms; a plurality of highway trucks; a plurality of containers for the freight, each of said cars being provided with a plurality of frames, each frame being adapted to support one of said containers and to be adjusted vertically and tilted, each of said platforms being provided with conveyor cables adapted to travel longitudinally of the platform and a plurality of frames identical in form and function with the car frames, adapted to deliver the containers to and from said cables, and each of said trucks being provided with a frame identical in form and function with the car and platform frames; a system of tracks for the cars; a system of tracks for the platforms; and a plurality of roadways for the trucks, disposed transversely of the tracks for the platforms, said track systems being so related that an unbroken train of cars can be so related to an unbroken train of platforms that the sets of frames on the cars register with the sets of frames on the platforms for loading and unloading each container on the cars, and said platform track system and said roadways being so related that the trucks can pass on said roadways between separated units of the train of platforms, for loading and unloading each container on the trucks by means of the cables on the platforms and the frames on the trucks.

6. In a vehicle, the combination of a chassis; a frame carried by said chassis; four pairs of toggle bars, one bar of each pair being pivoted to said frame, the other bar of each pair being supported by an abutment slidably mounted on said chassis; a handle on each side of said chassis attached to the abutments supporting the bars on that side; two cables to which two pairs of bars are pivoted respectively; two pressure chambers, each having a piston attached to each cable respectively; and means adapted to control pressure applied to each piston to reciprocate said cables.

7. In a vehicle, the combination of a chassis; a plurality of frames carried by said chassis; two series of pairs of toggle bars, one bar of each pair being pivoted to one corner of a frame, the other bar of each pair being supported by an abutment slidably mounted on said chassis; a handle attached to each pair of abutments supporting the bars of the pairs of bars associated with each frame, and adapted to move said abutments into and out of supporting position for their associated bars; two cables to which the pairs of bars of each series are pivoted respectively; two pressure chambers, each having a piston attached to each cable respectively; and means adapted to control pressure applied to each piston to reciprocate said cables.

8. In a vehicle, the combination of a chassis; a frame carried by said chassis; four pairs of toggle bars adapted to expand and contract to raise and lower said frame, respectively, when rendered operative, one bar of each pair being pivoted to said frame, the other bar of each pair being carried by said chassis; means adapted to be adjusted to render alternatively operative and inoperative each pair of toggle bars; two reciprocable cables to which two pairs of bars are pivoted, respectively; two pressure chambers, each having a piston attached to each cable respectively; and means adapted to control pressure applied to each piston to reciprocate said cables to expand and contract said toggle bars when said bars are rendered operative.

9. In a vehicle, the combination of a chassis; a plurality of rectangular frames carried by said chassis; two series of pairs of toggle bars adapted to expand and contract to raise and lower said frames, respectively, when rendered operative, one bar of each pair being pivoted to one corner of a frame, the other bar of each pair being carried by said chassis; two reciprocable cables to which the pairs of bars of each series are pivoted, respectively; two pressure chambers, each having a piston attached to each cable respectively; and means adapted to control pressure applied to each piston to reciprocate said cables to expand and contract said toggle bars when said bars are rendered operative; and means adapted to be adjusted to render alternatively operative and inoperative each pair of toggle bars.

References Cited in the file of this patent

UNITED STATES PATENTS

| | | |
|---|---|---|
| 740,275 | Holl | Sept. 29, 1903 |
| 1,124,178 | Schroeder | Jan. 5, 1915 |
| 1,648,301 | Fitch | Nov. 8, 1927 |
| 1,783,363 | Grob | Dec. 2, 1930 |
| 1,989,920 | Fildes | Feb. 5, 1935 |
| 2,287,068 | Shonnard | June 23, 1942 |
| 2,467,354 | Baldwin | Apr. 12, 1949 |
| 2,471,901 | Ross | May 31, 1949 |
| 2,556,399 | Sanger et al. | June 12, 1951 |